United States Patent
Fujimura et al.

[11] Patent Number: 6,151,092
[45] Date of Patent: Nov. 21, 2000

[54] LIQUID CRYSTAL DEVICE, INCLUDING SUPPORT COLUMNS

[75] Inventors: Eiji Fujimura; Kazuki Karasawa, both of Nagano, Japan

[73] Assignee: Seiko Epson Corporation, Japan

[21] Appl. No.: 09/392,703

[22] Filed: Sep. 9, 1999

Related U.S. Application Data

[63] Continuation of application No. 09/091,599, filed as application No. PCT/JP97/03251, Jun. 16, 1998, Pat. No. 5,973,763.

[30] Foreign Application Priority Data

Oct. 16, 1996 [JP] Japan ................................ 8-273809

[51] Int. Cl.[7] .............................................. G02F 1/1339
[52] U.S. Cl. ...................................... 349/156; 349/153
[58] Field of Search ................................ 349/156, 155, 349/153, 152

[56] References Cited

U.S. PATENT DOCUMENTS

| | | | |
|---|---|---|---|
| 4,158,485 | 6/1979 | Mueller et al. | 350/343 |
| 5,812,232 | 9/1998 | Shiroto et al. | 349/157 |
| 5,946,057 | 8/1999 | Kusanagi | 349/40 |
| 5,949,511 | 9/1999 | Park | 349/139 |

FOREIGN PATENT DOCUMENTS

| | | |
|---|---|---|
| 57-17923 | 1/1982 | Japan . |
| 5-127172 | 5/1993 | Japan . |
| 8-29795 | 2/1996 | Japan . |
| 8-248436 | 9/1996 | Japan . |
| 9-101527 | 4/1999 | Japan . |

*Primary Examiner*—Kenneth Parker
*Attorney, Agent, or Firm*—Harness, Dickey & Pierce, P.L.C.

[57] ABSTRACT

Substantially rectangular cut portions (11b) are formed at four substantially rectangular bent portions of a seal material (11) between an element substrate (10) and an opposing substrate (20), by removing the corners at the outer sides of the bent portions. Vertical electrically conducting members (13) are formed at the substantially triangular cut portion areas in order to allow electrical conduction between a signal input pad (18) on the element substrate and a transparent electrode (22) on the opposing substrate. The vertical electrically conducting members are virtually uniformly disposed along the outer periphery of the seal material. The vertical electrically conducting members act as supporting columns when the element substrate and the opposing substrate are being bonded together, and reduce the amount of deformation of the seal material when the opposing substrate contacts the seal material from one side during the bonding together of the substrates, so that the sealing performance of the seal material in the liquid crystal device is not affected, thereby making it possible to obtain a uniform cell thickness.

10 Claims, 10 Drawing Sheets

LIQUID CRYSTAL DEVICE, INCLUDING SUPPORT COLUMNS

This is a continuation of U.S. patent application Ser. No. 09/091,599, filed Jun. 16, 1998 now U.S. Pat. No. 5,973,763, and a continuation of PCT/JP97/03251, filed Oct. 16, 1997.

TECHNICAL FIELD

The present invention relates to a liquid crystal device, a method of producing the same, and a projection display apparatus, and, more particularly, to a structure and a producing technique suitable for a liquid crystal device whose liquid crystal cell is constructed by bonding two substrates together with a seal material.

BACKGROUND ART

In general, a liquid crystal device is often constructed by producing two substrates, a first substrate and a second substrate, each of which has an electrode on its surfaces. A seal material, made of photo-setting resin or the like, is placed on the inside surface of the first substrate so as to surround a display area, and the second substrate is bonded to the first substrate through the seal material, thereby producing a liquid crystal cell with a predetermined gap (cell gap) between the substrates.

In bonding the aforementioned substrates together, the substrates are adhered together with an unhardened seal material, and the adhered substrates are pressed by a certain amount in order to temporarily press-bond them together. Then, in order to position the substrates parallel to each other and form the cell gap with precision, a jig is used to fix the substrates while applying pressure to the substrates. When the seal material is one having a photo-setting property, the seal material is hardened by irradiating light thereto.

In this case, and particularly in the case where a liquid crystal device with a large liquid crystal display area is to be constructed, a method may be used, in which transparent spacers with diameters formed in correspondence with the cell gap are not uniformly disposed within the liquid crystal display area between the substrates. The first substrate is placed upon the second substrate for pressing, with the cell gap maintained by the spacers. Here, the spacers may be provided in the seal material.

For liquid crystal projectors, video finders, or the like, which have a liquid crystal display area that is small but a very fine display quality, spacers may be provided in the seal material to define the cell gap, instead of being not uniformly provided within the liquid crystal display area to increase the brightness and accuracy of the display.

Figure 9:
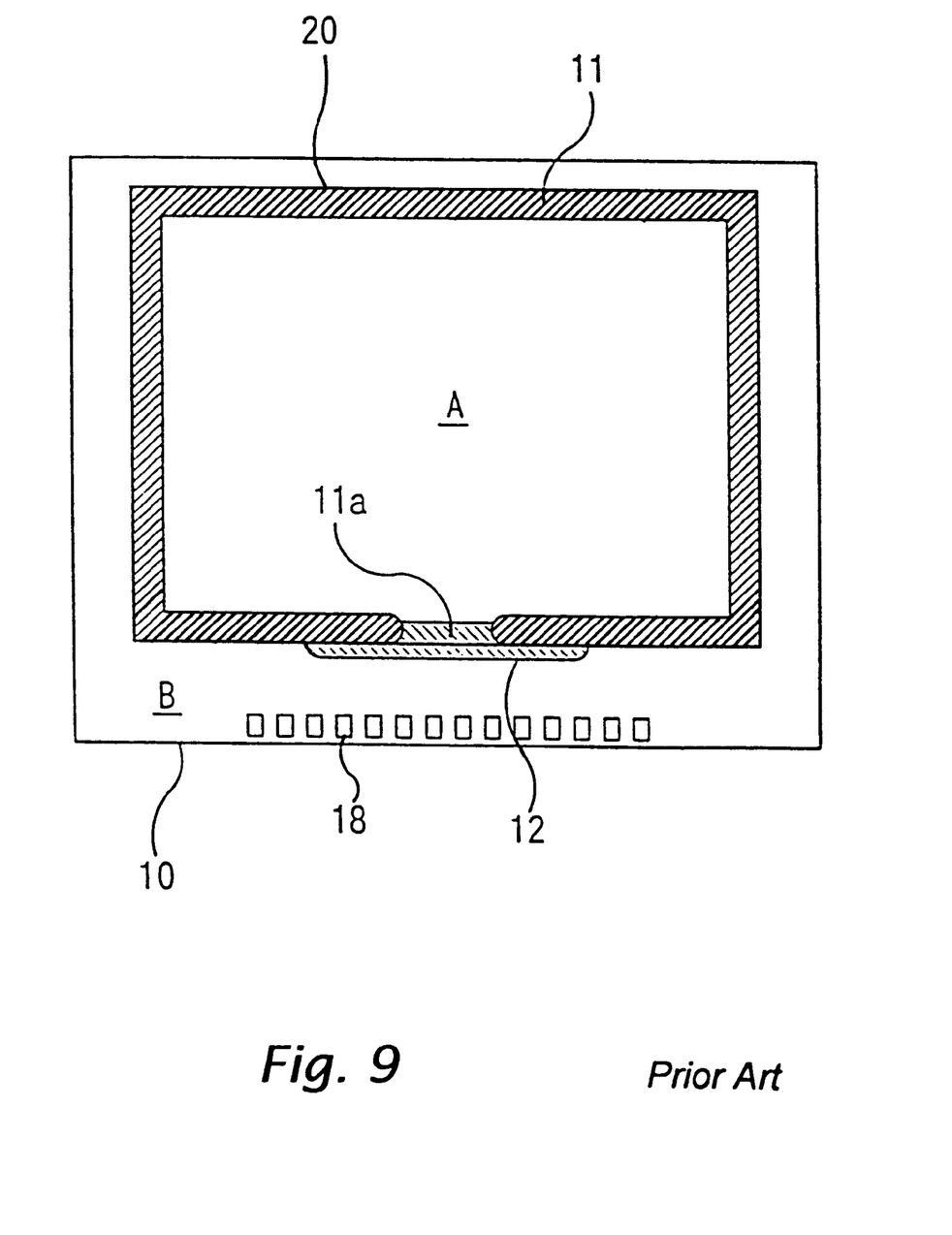
FIG. 9 is a schematic perspective plan view of a liquid cell of a conventional liquid crystal device.

FIG. 9 is a planar view of a small liquid crystal panel for a liquid crystal projector. A seal material 11 is placed onto the surface of a transparent element substrate 10, made of glass or the like, so as to surround a liquid crystal display area A. An opposing substrate 20, which is slightly smaller than the element substrate 10, is placed on the element substrate 10 having the hardened seal material 11 placed thereon to bond them together. An opening 11a is previously formed in the seal material 11. Liquid crystal is injected into the liquid crystal display area A from the opening 11a, after which the opening 11a is sealed by a sealing material 12.

Figure 6A:
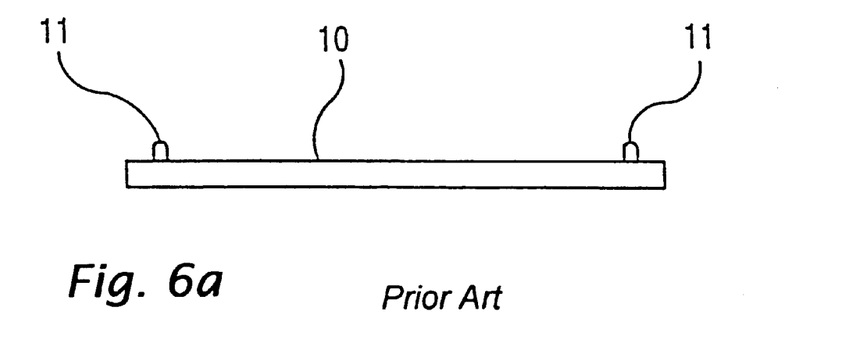
FIGS. 6A to 6C are views schematically illustrating the steps of a conventional method of producing a liquid crystal device.

In the above-described conventional liquid crystal panel producing process, it is necessary to bond the element substrate 10 and the opposing substrate 20 together with the seal material 11. In this case, as shown in FIG. 6A, the seal material 11 is placed on the inside surface of the element substrate 10 in such a manner as to surround the liquid crystal display area, using a dispenser or the like. Then, as shown in FIG. 6B, the opposing substrate 20 is placed on the element substrate 10 through the seal material 11.

Figure 6B:
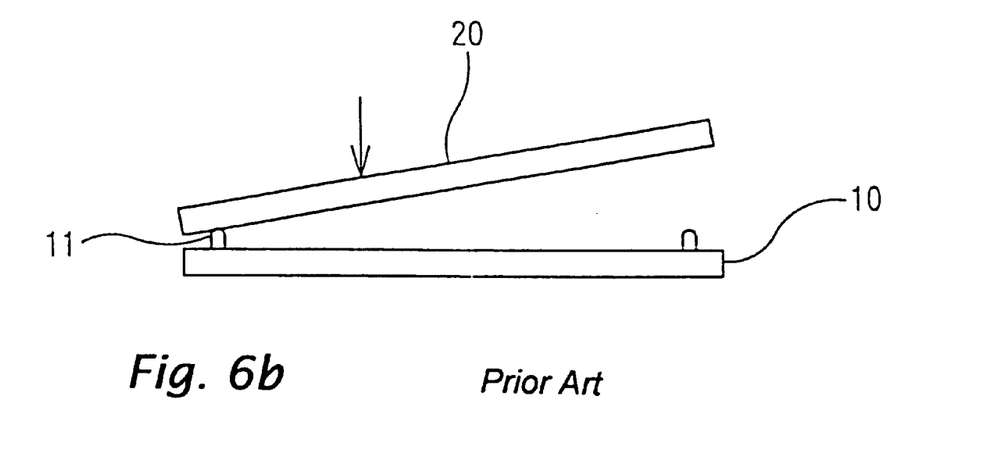
Figure 6C:
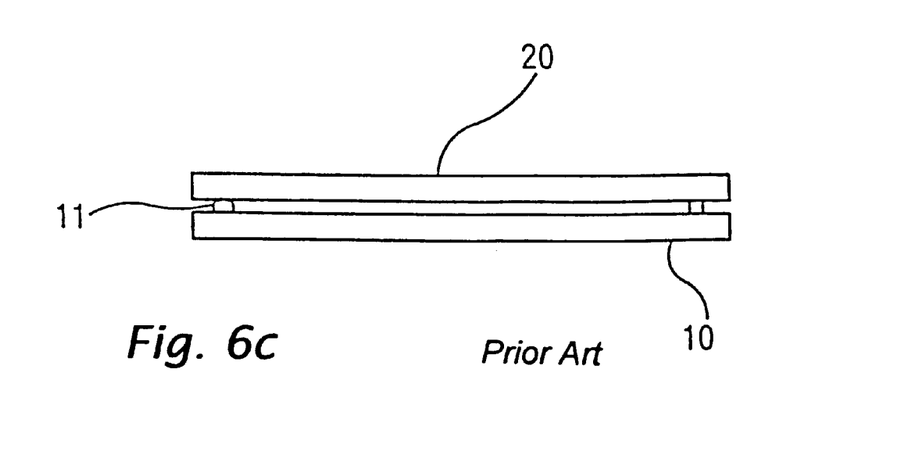

However, in conventional producing methods, when the opposing substrate 20 is being placed onto the element substrate 10, the opposing substrate 20 is slightly tilted so that it frequently contacts the seal material 11 from the side, as shown in FIG. 6B. Thereafter, as shown in FIG. 6C, even the element substrate 10 and the opposing substrate 20 are positioned substantially parallel to each other, the part of the seal material 11, which is first contacted by the opposing substrate 20 (or the left sectional portion of the seal material in FIG. 6), is deformed, reducing the sealing performance of this portion of the seal material with respect to the opposing substrate 20. When sealing performance of the seal material 11 is reduced, the liquid crystal panel's durability, shock resistance, and the like are reduced. In extreme cases, leaks occur at the liquid crystal sealing portion that must be firmly sealed by the two substrates and the seal material.

In view of the above-described problems, it is an object of the present invention to provide a novel structure and producing method of a liquid crystal device, in which a seal material is not easily deformed, even when a substrate being bonded to another substrate contacts the seal material from one side, so that the sealing property of the seal material is not affected, and a uniform cell thickness distribution can be obtained.

DISCLOSURE OF INVENTION

To this end, according to one aspect of the present invention, there is provided a liquid crystal device comprising: two substrates, a first substrate and a second substrate, each of which is provided with an electrode; a seal material which is interposed between the two substrates and is affixed such that a gap is formed between the two substrates; a liquid crystal layer filled in a liquid crystal filling area enclosed by the substrates and the seal material; and a plurality of supporting columns interposed between the substrates so as to be disposed in a plane substantially uniformly along the outer periphery of the seal material.

In the one aspect of the present invention, a plurality of supporting columns are placed in a plane substantially uniformly along the outer periphery of the seal material, so that even when the second substrate is tilted and contacts the first substrate with the seal material placed thereon, the amount of deformation of the seal material is reduced by the supporting columns. Therefore, in the step of bonding the substrates together, it is possible to prevent insufficient adhesion between the seal material and the substrate as well as leaks, which occur when the second substrate comes into contact with the seal material from one side. In addition, it is possible to obtain a uniform cell thickness, even when the second substrate contacts the seal material from one side.

Preferably, in the liquid crystal device, at least one of the supporting columns is formed into an electrically conducting member between the substrates in order to be connected in an electrically conductive manner between an electrically conducting member connected to the electrode of the first substrate and an external connecting terminal of the second substrate.

In this case, at least one of the supporting columns is formed as an electrically conducting member between the substrates, making it possible to use a fewer number of supporting columns that only serve as supporting columns, so that the display member can be reduced in size without making the display area of the liquid crystal device smaller.

Preferably, in the liquid crystal device, the liquid crystal filling area is planar and substantially rectangular in shape, and the supporting columns may be disposed near four corners at the outer side of the seal material.

In this case, the liquid crystal display area is planar and substantially rectangular, so that the supporting columns can be disposed in the vicinity of the corners of the seal material surrounding the area. Thus, the stress from the second substrate can be reliably sustained by a fewer number of supporting columns, regardless of the tilting direction of the second substrate, thereby preventing the seal material from being deformed, so that insufficient adhesion between the seal material and the second substrate occurs less frequently.

Preferably, in the liquid crystal device, the seal material has a plurality of bent portions, and cut portions formed by cutting the corners at the outer sides of the bent portions, and the supporting columns may be disposed at the cut portions.

In this case, the supporting columns are provided at the cut portions formed by cutting the corners at the outer sides of the bent portions, so that the supporting columns can be placed where portions of the seal material were meant to be formed, making it unnecessary to separately provide supporting column forming areas, as a result of which the display member is reduced in size. In addition, the supporting columns are formed exteriorly of the bent portions of the seal material, and very near the seal material, so that the supporting columns can reliably sustain the stress from the second substrate, regardless of the tilting direction of the second substrate being bonded to the first substrate, making it possible to further enhance the effect of the liquid crystal device.

Preferably, in the liquid crystal device, the supporting columns have spacers provided therein, each of the spacers having an effective diameter formed in correspondence with a predetermined gap between the substrates.

In this case, spacers are provided in the supporting columns, so that the spacers are formed with effective diameters that allow them to reliably function as supports between the substrates. When the supporting column is an electrically conducting member between substrates, it is preferable that the spacer be electrically conductive.

According to another aspect of the present invention, there is provided a method of producing a liquid crystal device comprising a liquid crystal layer filled in a liquid crystal filling area enclosed by a seal material interposed between two substrates, a first substrate and a second substrate, each of which is provided with an electrode, the method comprising the steps of: placing an unhardened seal material on a surface of the first substrate such that the unhardened seal material surrounds a predetermined area; interposing a plurality of supporting columns between the substrates so as to be disposed in a plane substantially uniformly either along the outer periphery of the seal material or in a predetermined seal material-placing area; bonding the second substrate from above onto the first substrate; and hardening the seal material in order to form a liquid crystal cell.

Preferably, in the method, at least one of the supporting columns is formed into an electrically conducting member between the substrates in order to be connected in an electrically conductive manner between an electrically conducting member connected to the electrode of the first substrate and an external connecting terminal of the second substrate.

In this case, at least one of the supporting columns is formed as an electrically conducting member between the substrates, making it easier to form supporting columns at many locations, without performing additional steps.

Preferably, the method further comprises the step of semi-hardening the supporting columns prior to the step of bonding the second substrate to the first substrate.

In this case, the substrates are bonded together after semi-hardening the supporting columns, so that the stress produced during bonding of the substrate can be sustained by the semi-hardened supporting columns, thereby further reducing the amount of deformation of the seal material, and thus making it possible to further enhance the aforementioned effect of the liquid crystal device. The extent to which the supporting columns are semi-hardened is suitably adjusted based on the hardness of the seal material with respect to the supporting columns, which is effectively achieved by setting conditions that minimize the effect of the second substrate on the seal material, during substrate bonding.

In addition, respective means mentioned above can be effective for liquid crystal devices which are small but require high-definition display, like particularly light-projecting sections of liquid crystal projectors or video finders.

The above means are effective for a liquid crystal device which is small and requires high-definition display because spacers are often not provided in the liquid crystal display area, which frequently results in sealing failure and formation of an improper gap as a result of deformation of the seal material during substrate bonding. When spacers for defining a gap between substrates are provided in the liquid crystal display area, the display quality deteriorates due to the plurality of pixels arranged in the liquid crystal display area which is small.

When an attempt is made to construct a high-definition and bright liquid crystal device having a high display density and high transmissivity for use in a projection display apparatus which projects an image onto a screen by modulating light, emitted from a light source, by a liquid crystal device, a high-quality liquid crystal device cell is required. Thus, it is desirable to use the above-described liquid crystal device of the present invention particularly in such a projection display apparatus.

BEST MODE FOR CARRYING OUT THE INVENTION

A description will now be given of embodiments of the present invention, with reference to the drawings.

First Embodiment

Figure 1:
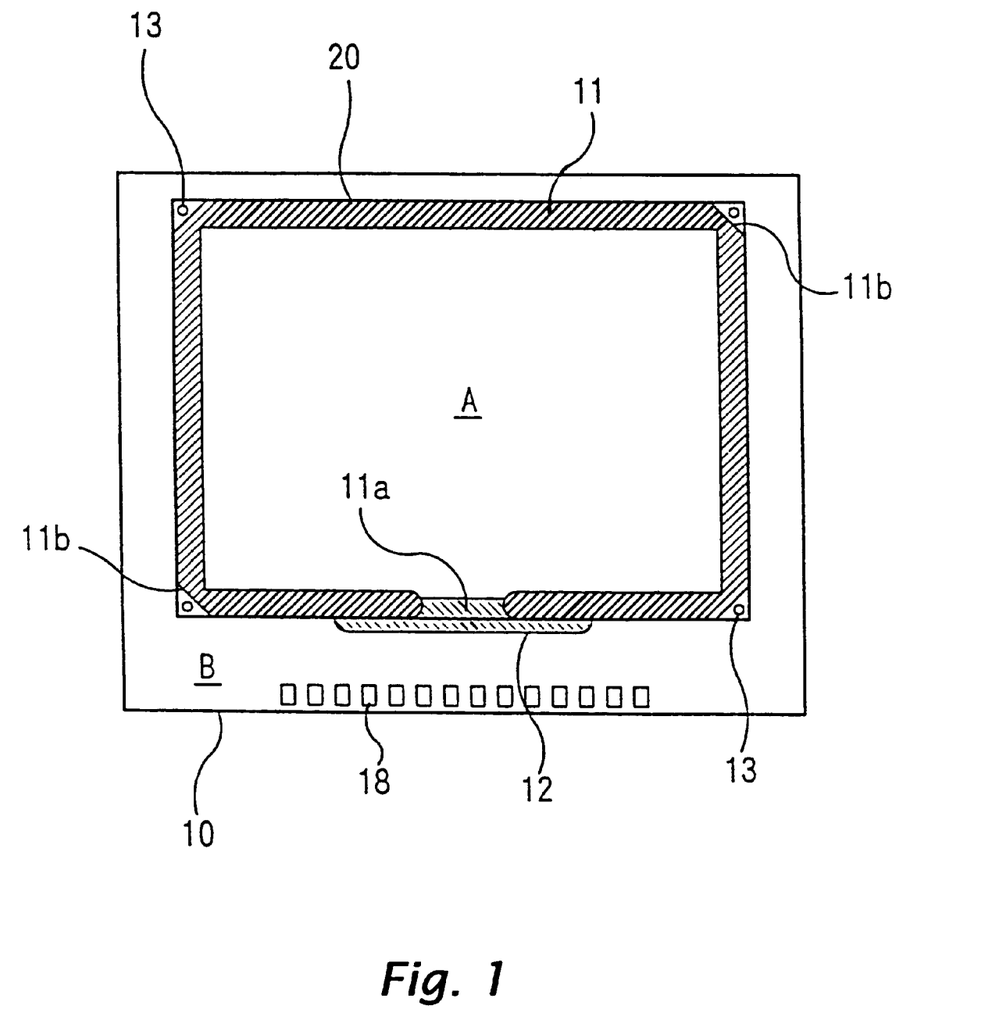
FIG. 1 is a schematic plan view of a liquid crystal cell in a first embodiment of a liquid crystal device in accordance with the present invention.
Figure 2:
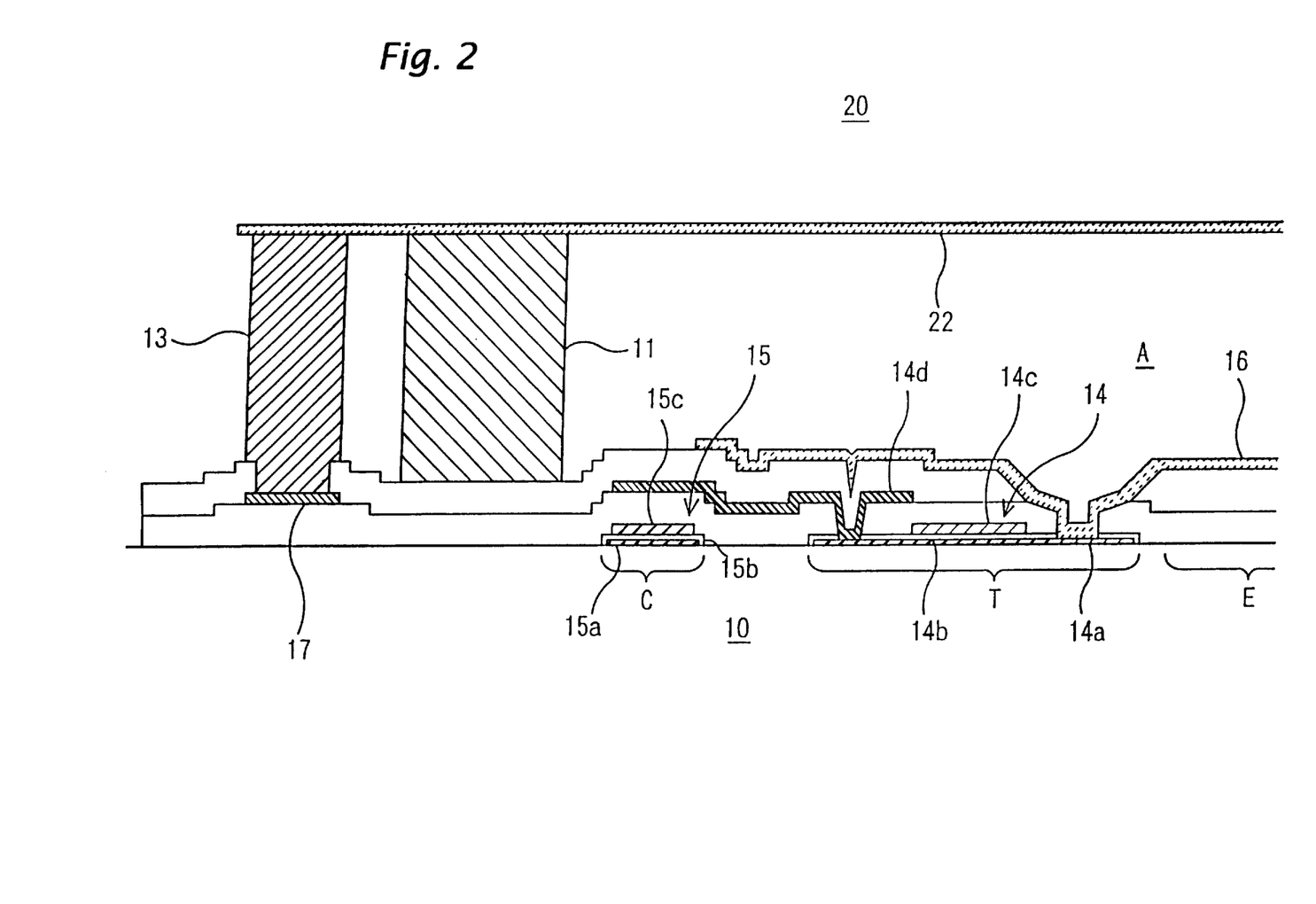
FIG. 2 is a schematic enlarged vertical sectional view of the structure of the peripheral edge of the liquid crystal cell in the first embodiment.

FIG. 1 is a schematic plan view of the entire structure of a first embodiment of a liquid crystal device in accordance with the present invention. FIG. 2 is an enlarged sectional view of the outer edge of the liquid crystal display area in the first embodiment. In the present embodiment, an active matrix liquid crystal display used for the light projection section of a liquid crystal projector is used as an example. In the liquid crystal projector, thin film transistors (TFT) are used as active elements for every pixel. In the liquid crystal projector, light is separated into, for example, three colors by a dichroic mirror, and the colors irradiate and pass through liquid crystal display members, provided for each color, after which the colors of the separated light are combined in order to project a predetermined image onto, for example, a screen.

An element substrate 10, formed of a transparent material such as a glass plate, has formed on its inside surface and into a predetermined pattern a plurality of stripe-like wiring layers arranged in a row, TFT elements formed for every pixel and disposed in a matrix arrangement in correspondence with the wiring layers, and transparent electrodes formed for every pixel. In addition, an alignment layer is formed on top of this structure consisting of the wiring layers, the TFT elements, and the transparent electrodes, by a known conventional rubbing operation.

As shown in FIG. 2, a plurality of stripe-like transparent electrodes 22 are formed on the inside surface of an opposing substrate 20 so as to be arranged in a row at locations corresponding to the locations of the pixels.

The element substrate 10 is formed slightly larger than the opposing substrate 20, with a plurality of signal input pads 18, formed of thin aluminum films or the like, being formed in the outside area of the element substrate 10 extending beyond the opposing substrate 20. These signal input pads 18 are connected to the wiring layers formed on the inside surface of the element substrate 10, as well as to the transparent electrodes 22, formed on the opposing substrate 20, through vertical electrically conducting members (described later) that allow electrical conduction between the substrates.

As shown in FIG. 1, a substantially rectangular seal material 11 is placed on the inside surface of the element substrate 10 so as to surround a liquid crystal display area A in which the aforementioned pixels are arranged in a row. A known liquid crystal is injected within the seal material 11. The seal material 11 is made of, for example, a photosetting resin, and is adhered onto the element substrate 10 by a producing method (described later) such that the two substrates are adhered parallel to each other and spaced apart by a gap of about a few micrometers.

An opening 11a is formed in the seal material 11, and is sealed by a sealing material 12. Thus, the seal material 11 completely seals the liquid crystal filling space, forming the liquid crystal display area A so as to separate the area A from an outside area B.

Cut portions 11b are formed by cutting substantially triangular portions from the corners at the outer sides of four bent portions of the seal material 11, with the bent portions forming the seal material 11 into a substantially rectangular shape. Vertical electrically conducting members 13 are formed at each of the cut portions 11b in order to allow electrical conduction between the aforementioned signal input pads 18 on the element substrate 10 and the transparent electrodes 22 on the opposing substrate 20.

These vertical electrically conducting members 13 are formed by hardening an electrically-conductive plastic material, such as conductive ink containing conductive carbon or the like, or a silver paste. They can be made of other electrically conductive materials providing a certain amount of rigidity. Although the vertical electrically conducting members 13 of the present embodiment were formed into a cylindrical shape with a diameter of about 0.5 mm and a height of 4.5 $\mu$m, they may be formed into any other shape in other embodiments, as long as they function as supporting columns between the two bonded substrates, when they are interposed therebetween.

The vertical electrically conducting members 13 are basically disposed in a plane almost uniformly along the outer periphery of the seal material 11. In the present embodiment, the vertical electrically conducting members 13, which are disposed exteriorly of the four bent portions of the seal material 11, are substantially uniformly disposed. In addition to allowing electrical conduction between the two substrates, the vertical electrically-conducting members 13, along with the seal material 11, also serve as supporting columns between the two substrates, at the outer side of the seal material 11.

FIG. 2 is a schematic sectional view showing the portion of the structure extending from the peripheral edge of the liquid crystal display area A to where the seal material 11 and the vertical electrically conducting members 13 are formed. In the liquid crystal display area A, there are formed a TFT element 14, a storage capacitor 15, and a transparent electrode 16, being a pixel electrode, in each pixel of a pixel structure similar to the pixel structure formed across all of liquid crystal display area A on the surface of the element substrate 10. In FIG. 2, the area designated T corresponds to the portion in which the TFT element 14 is formed, the area designated C corresponds to the portion in which the storage capacitor 15 is formed, and the area designated E corresponds to the portion in which the pixel display portion is formed.

The TFT element 14 comprises an active layer 14a, made of polycrystalline silicon; a thin insulating layer 14b covering the upper surface of the active layer 14a; a gate electrode 14c opposing the active layer 14a through the insulating layer 14b; and a source electrode layer 14d and a transparent electrode 16, for conducting electricity to the active layer 14a, at both sides of the gate electrode 14c. The source electrode layer 14d is connected to a source wiring layer, while the gate electrode is connected to a gate wiring layer.

The storage capacitor 15 is connected parallel to a liquid crystal layer in order to retain the voltage applied to the liquid crystal layer. The storage capacitor 15 comprises a lower electrode 15a, made of polycrystalline silicon; an insulating layer 15b covering the lower electrode; and an upper electrode layer 15c, formed on the insulating layer and made of polycrystalline silicon.

On the other hand, the opposing substrate 20 has formed on its surface transparent electrode 22 formed in correspondence with the pixel area in which the TFT element 14, the storage capacitor 15, and the transparent electrode 16 are formed.

An insulating film, formed in the liquid crystal display area A, extends to the peripheral edge of the liquid crystal area A on the element substrate 10, and a wiring pattern, formed within the liquid crystal display area A and connected to a wiring layer (not shown), is led to the outer side of the seal material 11.

The seal material 11, which is formed at the outer side of the liquid crystal display area A, is used as a support between the element substrate 10 and the opposing substrate 20. Similarly, the vertical electrically conducting members 13 are formed exteriorly of the seal material 11 as supports between the element substrate 10 and the opposing substrate 20. The vertical electrically conducting members 13, which are formed on the element substrate 10, contact a connecting pad 17 and the transparent electrode 22 of the opposing substrate 20 in an electrically conductive manner, with the connecting pad 17 being connected to the signal input pads 18 of FIG. 1 in an electrically conductive manner.

In the present embodiment, the vertical electrically conducting members 13, being supporting columns, are disposed at the four cut portions of the seal material 11, with the cut portions being formed by cutting the four corners of the seal material 11 at the outer sides of the bent portions, so that the pressing force of the opposing substrate 20 is exerted onto the vertical electrically-conductive members 13, no matter what angle the opposing substrate 20 is tilted with respect to the element substrate when the substrates are being bonded together, thereby reducing the extent to which the seal material is deformed. As a result, the sealing performance of the seal material is preserved, thereby preventing leaks from the liquid crystal filling area. For example, when the supporting columns are not disposed at the outer sides of the bent portions of the seal material, the seal material, depending on the tilting direction of the opposing substrate 20, is greatly deformed, which may seriously damage the liquid crystal cell at the bent portions.

In the present embodiment, the vertical electrically conducting members 13 are constructed as supporting columns disposed between the element substrate 10 and the opposing substrate 20. Here, the vertical electrically conducting members 13 are ordinarily formed at appropriate locations in accordance with the conducting member patterns on the inner surfaces of the element substrate 10 and the opposing substrate 20. However, in the present embodiment, the supporting columns must be substantially uniformly disposed along the outer periphery and at the outer side of the seal material 11. Accordingly, in order to virtually uniformly dispose the vertical electrically conducting members 13 along the outer periphery of the seal material 11, it may become necessary to correct the conducting member patterns on both substrates.

Although in the present embodiment only vertical electrically conducting members 13 were used for the four supporting columns, in other embodiments there may be used vertical electrically conducting members 13 and, for example, a simple supporting column that does not need to be electrically conductive. Both of these are disposed virtually uniformly along the outer periphery of the seal material. For example, as in the second embodiment to be described below, two vertical electrically conducting members 13 are used at the locations adjacent to the signal input pads 18, while two supporting columns are used at the side opposite thereto. The supporting columns at the opposite side may be an electrically conducting member or an insulating member that are not connected to the wiring layers, the electrodes, the signal input pads, etc.

Figure 3A:
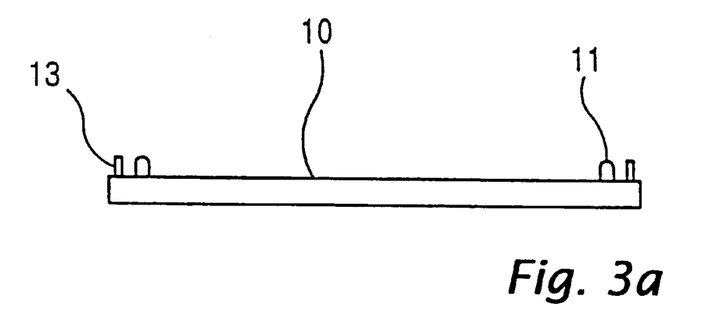
FIGS. 3A to 3C are views schematically illustrating the steps of an embodiment of a method of producing a liquid crystal device in accordance with the present invention.
Figure 3B:
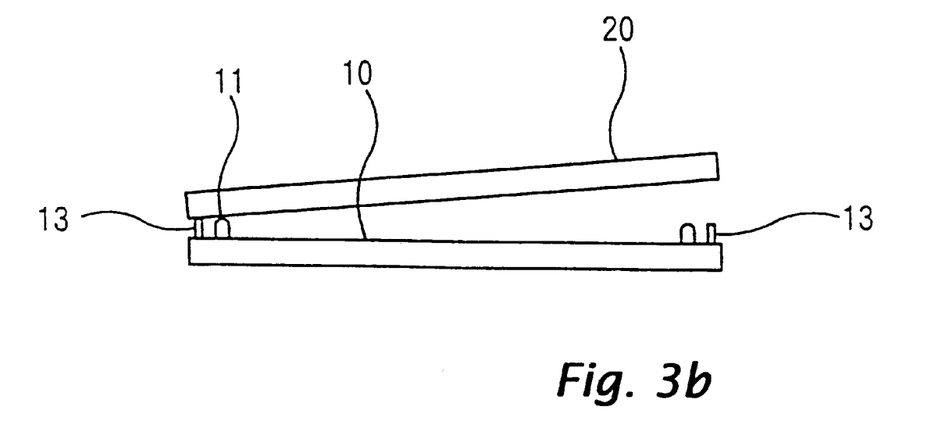
Figure 3C:
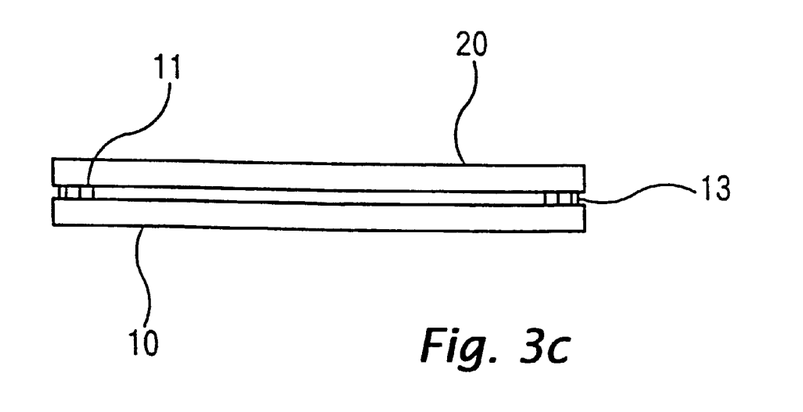

FIGS. 3A to 3C are views schematically illustrating the steps of an embodiment of a method of producing the aforementioned liquid crystal device. As shown in FIG. 3A, an unhardened seal material 11 and the vertical electrically conducting members 13 are placed on the surface of the element substrate 10. Here, the step of placing the vertical electrically conducting members 13 may be performed either prior to or after the step of placing the seal material 11. The seal material 11 is placed, with a dispenser or the like, along the direction of extension thereof. Similarly, a dispenser can also be used to form the vertical electrically conducting members 13. When the vertical electrically conducting members 13 are formed before placing the seal material 11, they can be formed, for example, by screen printing onto the surface of the element substrate 10.

Then, as shown in FIG. 3B, the opposing substrate 20 is placed on top of the element substrate 10 for press-bonding it. Here, the vertical electrically conducting members 13, being supporting columns, are placed at four locations exteriorly of the seal material 11. Therefore, as shown in the figure, even when the opposing substrate 20 is placed obliquely, so that it can contact the seal material 11 from one side, the stress produced, as a result of the opposing substrate 20 contacting the seal material 11 from one side, is spread out through the seal material 11 and the vertical electrically conducting members 13. Thus, the seal material, which was greatly deformed conventionally, is not greatly deformed. When the opposing substrate 20 contacts the vertical electrically conducting members 13 first, the seal material 11 is virtually not deformed, so that, as shown in FIG. 3C, the opposing substrate 20 and the element substrate 10 are firmly bonded together.

The above-described effect can be more reliably obtained by making the vertical electrically conducting members 13 thicker than the final cell gap of the liquid crystal display member. The vertical electrically conducting members 13 may be formed thinner than the seal material 11, but in order to reduce the amount of deformation of the seal material 11, it is preferable that the vertical electrically conducting members 13 and any other supporting column be formed thicker than the seal material 11.

Thereafter, the element substrate 10 and the opposing substrate 20 are positioned with precision in order to place them parallel to each other and form a predetermined cell gap between the substrates. With the substrates 10 and 20 precisely positioned, the seal material 11, and the vertical electrically conducting members 13 and any other supporting columns used are hardened. The seal material, and the vertical electrically conducting members 13 and any other supporting columns are hardened by heating, irradiation with light, or the like, depending on the hardening characteristics thereof. The step of hardening the seal material 11 and the step of hardening the vertical electrically conducting members 13 can be performed at the same time or separately.

Figure 4A:
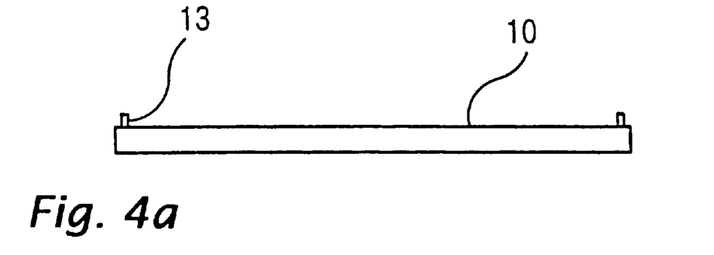
FIGS. 4A to 4D are views schematically illustrating the steps of another embodiment of a method of producing a liquid crystal device in accordance with the present invention.
Figure 4B:
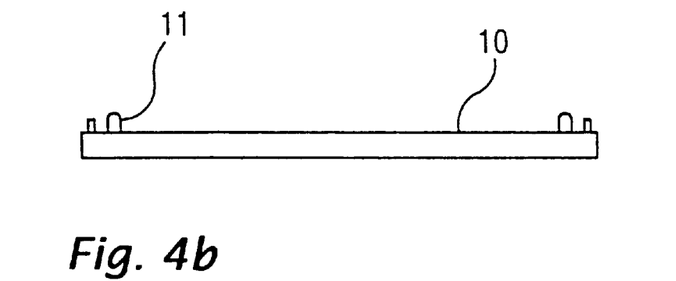

FIGS. 4A to 4C are views schematically illustrating the steps of another method of producing the aforementioned liquid crystal device. As shown in FIG. 4A, the vertical electrically conducting members 13 are placed on the element substrate 10 by print molding. Next, the placed vertical electrically conducting members 13 are semi-hardened, by heating, light irradiation, or the like. Then, as shown in FIG. 4B, the seal material 11 is provided by the dispensing method. Here, the supporting columns are made slightly thinner than the seal material.

Figure 4C:
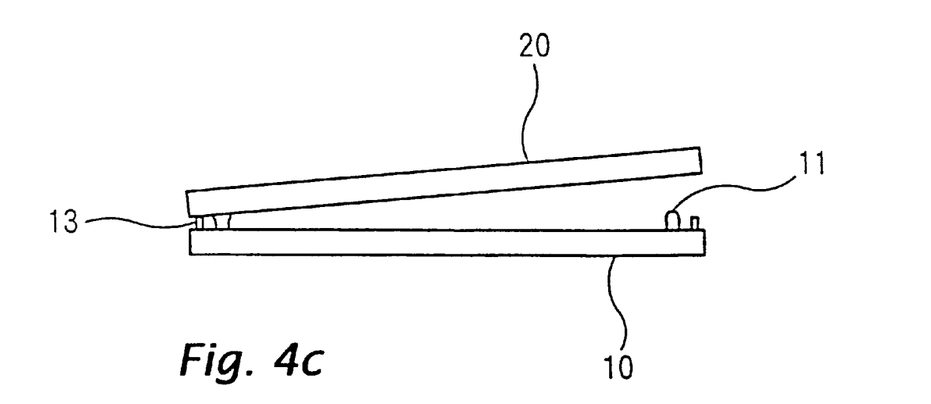

Thereafter, as shown in FIG. 4C, the opposing substrate 20 is placed on top of the seal material 11 and the vertical electrically conducting members 13. In this case, even when the opposing substrate 20 is slightly tilted with respect to the element substrate 10 such that part of the opposing substrate first comes into contact with part of the seal material 11 placed in a certain direction, the extent to which the seal material 11 is deformed is reduced based on the thicknesses of the vertical electrically conducting members 13 and any other supporting columns used. The vertical electrically conducting members 13 and any other supporting columns used are semi-hardened in order to oppose the press-bonding force produced when the opposing substrate 20 is being temporarily press-bonded.

Figure 4D:
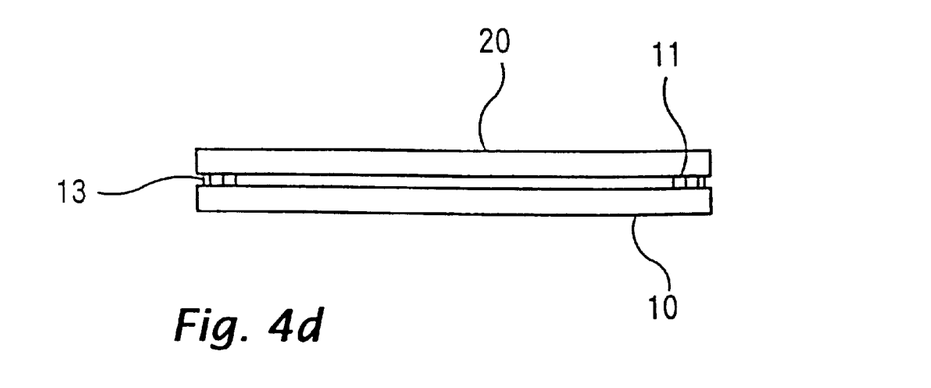

Thereafter, as shown in FIG. 4D, the opposing substrate 20 is bonded to the element substrate 10 almost parallel to the element substrate 10, and the substrates are spaced precisely by a gap with a special-purpose jig or the like, followed by hardening of the seal material 11. Here, when the hardening characteristics of the seal material 11 and those of the vertical electrically conducting members 13 match, the hardening of the seal material 11 and the complete hardening of the vertical electrically conducting members 13 can be performed by a common hardening process.

In the embodiment shown in FIG. 4, the vertical electrically conducting members 13 are made slightly thinner than the seal material 11. They may, however, be made thicker than the seal material, though in such a case the opposing substrate 10 is press-bonded with a slightly greater pressing force.

In each of the above-described embodiments, the vertical electrically conducting members 13 were used as supporting columns. However, supporting columns other than vertical electrically conducting members 13 may be used in other embodiments. In such a case, insulating members may be used as supporting columns, or there may be used members that are at least partly formed of the same material as the seal material and placed onto the substrate at the same time that the seal material is placed onto the substrate.

In the above-described embodiments, it is preferable that prior to the bonding step the vertical electrically conducting members 13 be made of materials that do not deform easily compared with the seal material 11. In this case, the vertical electrically conducting members 13, which are much less easily deformed, reduce the extent to which the seal material 11 is deformed when the substrate 20 comes into contact with the seal material 11 from one side. The seal material 11 and the vertical electrically conducting members 13 can be made more resistant to deformation by changing the main component used or by controlling the amount of solvent or mixture used.

A description will now be given of an embodiment in which spacers are provided in the seal material 11 and the vertical electrically conducting members 13, with reference to FIG. 5.

For a liquid crystal display member, there are cases where a spacer is provided in a liquid crystal layer or in a seal material in order to precisely form a uniform gap between the substrates. When a transparent spacer is provided in a liquid crystal layer, it is easier to form a uniform cell gap even in a panel with a large liquid crystal display area. On the other hand, when a spacer is provided in the aforementioned seal material 11 and the vertical electrically conducting members 13, fine particles or cylindrical particles, composed of transparent materials such as resin or glass fiber, are mixed in the seal material 11 and the vertical electrically conducting members 13. These fine or cylindrical particles form spacers that determine the thicknesses of the seal material 11 and the vertical electrically conducting members 13 in order to maintain a uniform gap between the substrates. These spacers allow a cell gap (particularly the cell gap at the peripheral edge of the liquid crystal display area A) to be easily and precisely formed during press-bonding of the substrate.

Figure 5:
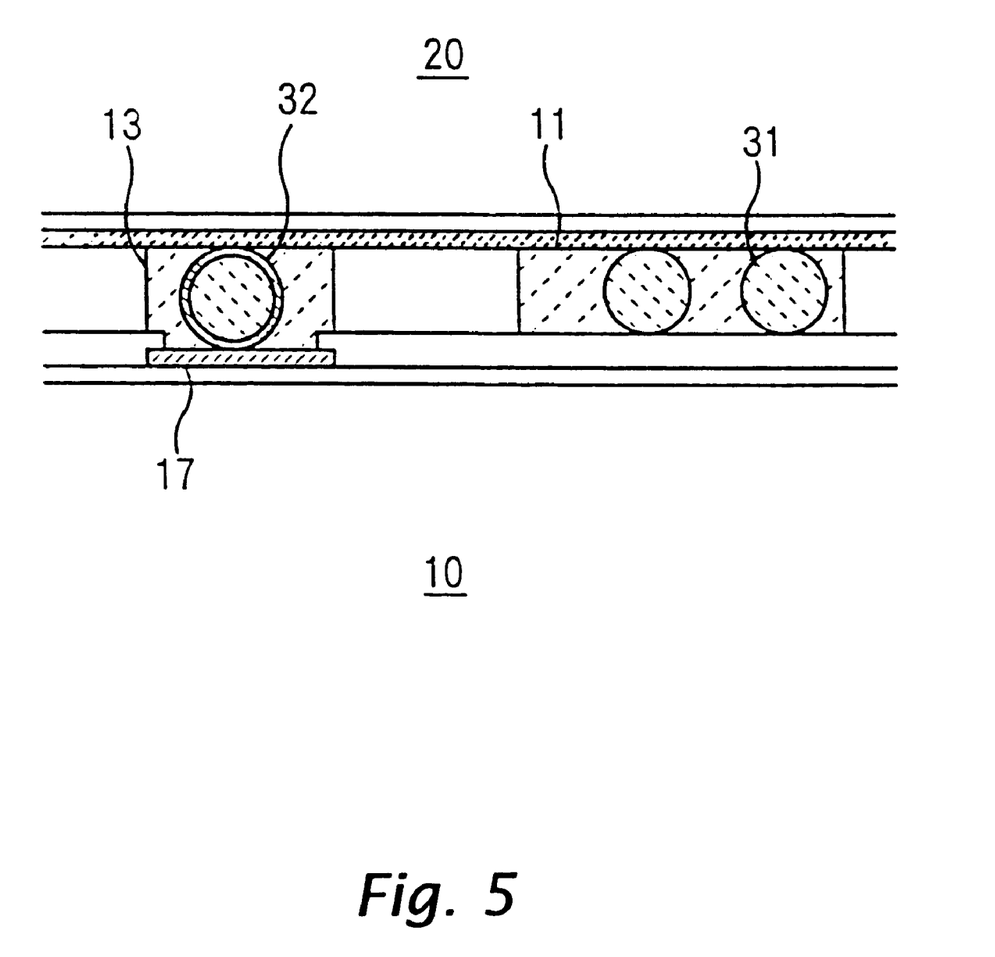
FIG. 5 is an enlarged view showing the relationship between the seal material and the supporting columns in the embodiment of the liquid crystal device in accordance with the present invention.

FIG. 5 is a view illustrating the relationship between spacers 31 and 32 provided in the seal material 11 and the vertical electrically conducting members 13 of a liquid crystal display member such as that shown in FIG. 2. The spacer 31, formed as a cylindrical portion with a diameter of about 4.5 $\mu$m and formed of a cylindrical glass fiber, is provided in the seal material 11. For the spacer 31, the most suitable diameter is chosen to produce the desired liquid crystal cell gap. These spacers 31 and 32 may be spherical.

On the other hand, a spacer 32, formed of almost the same glass fiber as that used to form the spacer 31 and having its surface subjected to nickel-silver (Ni—Ag) plating, is provided in each vertical electrically conducting member 13. For the spacer to be provided in each vertical electrically conducting member 13, it is advantageous to use a spacer made of an electrically conducting material so as not to affect the electrically conductive property of each vertical electrically conducting member 13. In addition to spacer 32 that is an electrically conducting member, it is desirable that an electrically conducting material (especially electrically conducting powder or grains), such as electrically conductive carbon or silver filler, be mixed in each of the vertical electrically conducting members 13.

In the above-described embodiments, it was assumed that the portions of the surfaces of the element substrate 10 and the opposing substrate 20, where the seal material 11 and the vertical electrically conducting members 13 and any other supporting columns were formed, were of the same height. Actually, however, various laminated structures are formed on the surfaces of the element substrate 10 and the opposing substrate 20, causing the portions of the surfaces to have different heights, so that, in general, there are differences in level between the portions where the seal material 11 is formed and the portions where the vertical electrically conducting members 13 are formed. For example, in FIG. 2, the size of the gap between the surface of the connecting pad 17 and the inner surface of the opposing substrate 20 is approximately 4.5 $\mu$m, whereas the thickness of the finished seal material 11 is approximately 4.2 $\mu$m.

Therefore, as shown in FIG. 5, it is necessary to form the diameters of the aforementioned spacers 31 and 32 (or the effective diameters of the spacers between the substrates) in accordance with the aforementioned differences in level between the portions where the seal material is formed and the portions where the vertical electrically conducting members are formed. Accordingly, if the seal material 11 and the vertical electrically conducting members 13 are to be formed with a thickness in correspondence with the cell gap, then, as mentioned above, the effective diameter of the spacer 32 in each vertical electrically conducting member 13 must be made a little larger than that of the spacer 31 in the seal material.

Second Embodiment

Figure 7:
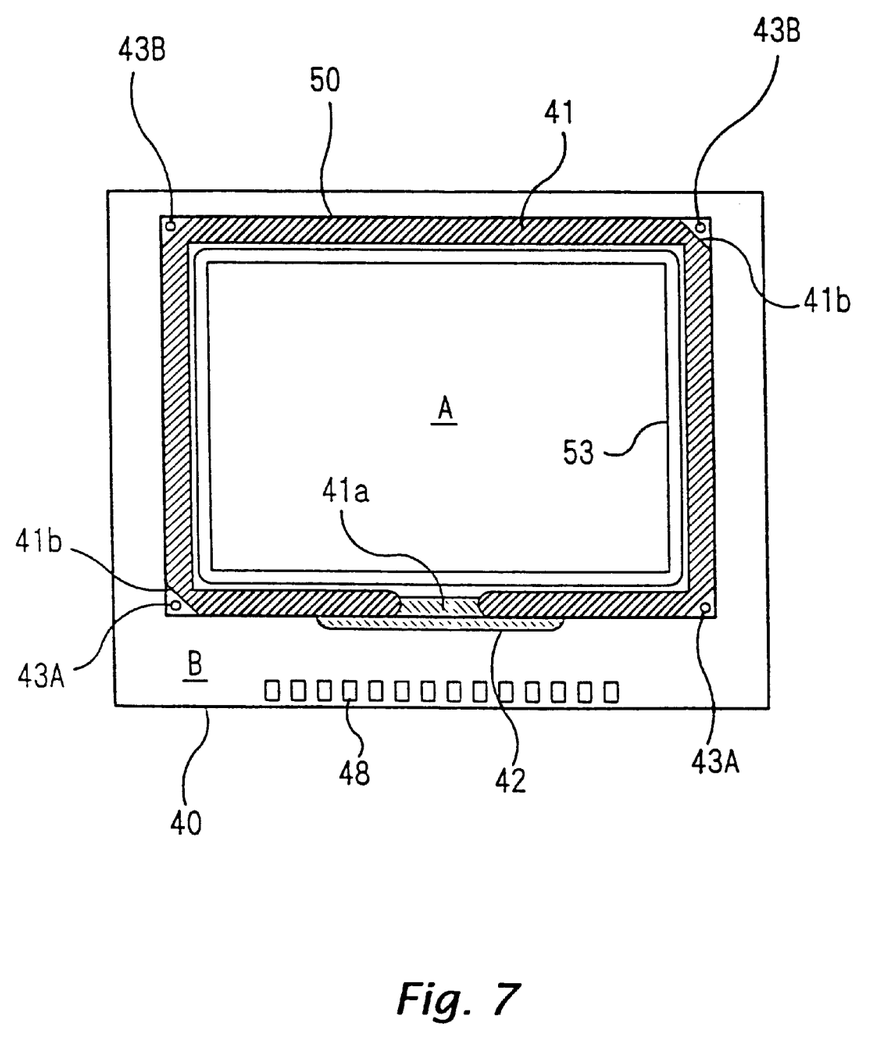
FIG. 7 is a schematic plan view of a liquid crystal cell in a second embodiment of a liquid crystal device in accordance with the present invention.

FIG. 7 is a schematic plan view of the structure of a second embodiment of a liquid crystal device in accordance with the present invention. In the present embodiment, an active matrix color liquid crystal display member is used as an example. In the color liquid crystal display member, TFTs are used as active elements and formed for every pixel.

An element substrate 40 has formed on its inside surface a wiring layer, TFT elements formed for every pixel and disposed in a matrix arrangement, and a transparent electrode, in such a manner as to form a predetermined pattern. An alignment layer is formed on top of this by rubbing.

On the other hand, an opposing substrate 50 has formed on its inside surface a color filter 51 with color layers formed at locations corresponding to the pixel locations, and a plurality of stripe-like transparent electrodes formed on the surface of the color filter 51 and disposed in a row.

The element substrate 40 is formed slightly larger than the opposing substrate 50, with a plurality of signal input pads 48, formed of thin aluminum films or the like, being formed at the outside area of the element substrate 40 extending beyond the opposing substrate 50. These signal input pads 48 are connected to the wiring layers formed on the inside surface of the element substrate 40, as well as to the transparent electrodes, formed on the opposing substrate, through vertical electrically conducting members (described later) that allow electrical conduction between the substrates.

A substantially rectangular seal material 41 is placed on the inside surface of the element substrate 40 so as to surround a liquid crystal display area A in which the aforementioned pixels are arranged in a row.

An opening 41a is formed in the seal material 41, and is sealed by a sealing material 42. Thus, the seal material 41 completely seals the liquid crystal filling space, forming the liquid crystal display area A so as to separate the area A from an outside area B.

Cut portions 41b are formed by cutting substantially triangular portions from the corners at the outer sides of four bent portions of the seal material 41, with the bent portions forming the seal material 41 into a substantially rectangular shape. Vertical electrically conducting members 43A and insulating members 43B, made of the same material as the seal material 41, are formed at each of the triangular cut portions 41b in order to allow electrical conduction between the aforementioned signal input pads 48 on the element substrate 40 and the transparent electrodes 52 on the opposing substrate 50.

The vertical electrically conducting members 43A, formed at the two cut portions 41b adjacent to the signal input pads 48, are essentially the same as the vertical electrically conducting members used in the first embodiment and are made of the same material. On the other hand, the insulating members 43B, formed at the opposite cut portions 41b, are formed simultaneously with and are made of the same material as the seal material 41.

Basically, the vertical electrically conducting members 43A and the insulating members 43B are disposed virtually uniformly along the outer periphery of the seal material 41. In the present embodiment, they are disposed virtually uniformly at the four outside bent portions of the seal material 41. The vertical electrically conducting members 43A are provided to allow electrical conduction between the two substrates, and, at the same time, to serve, along with the seal material 41, as supporting columns between the two substrates, exteriorly of the seal material 41. The insulating members 43B function exclusively as supporting columns between the two substrates.

Figure 8:
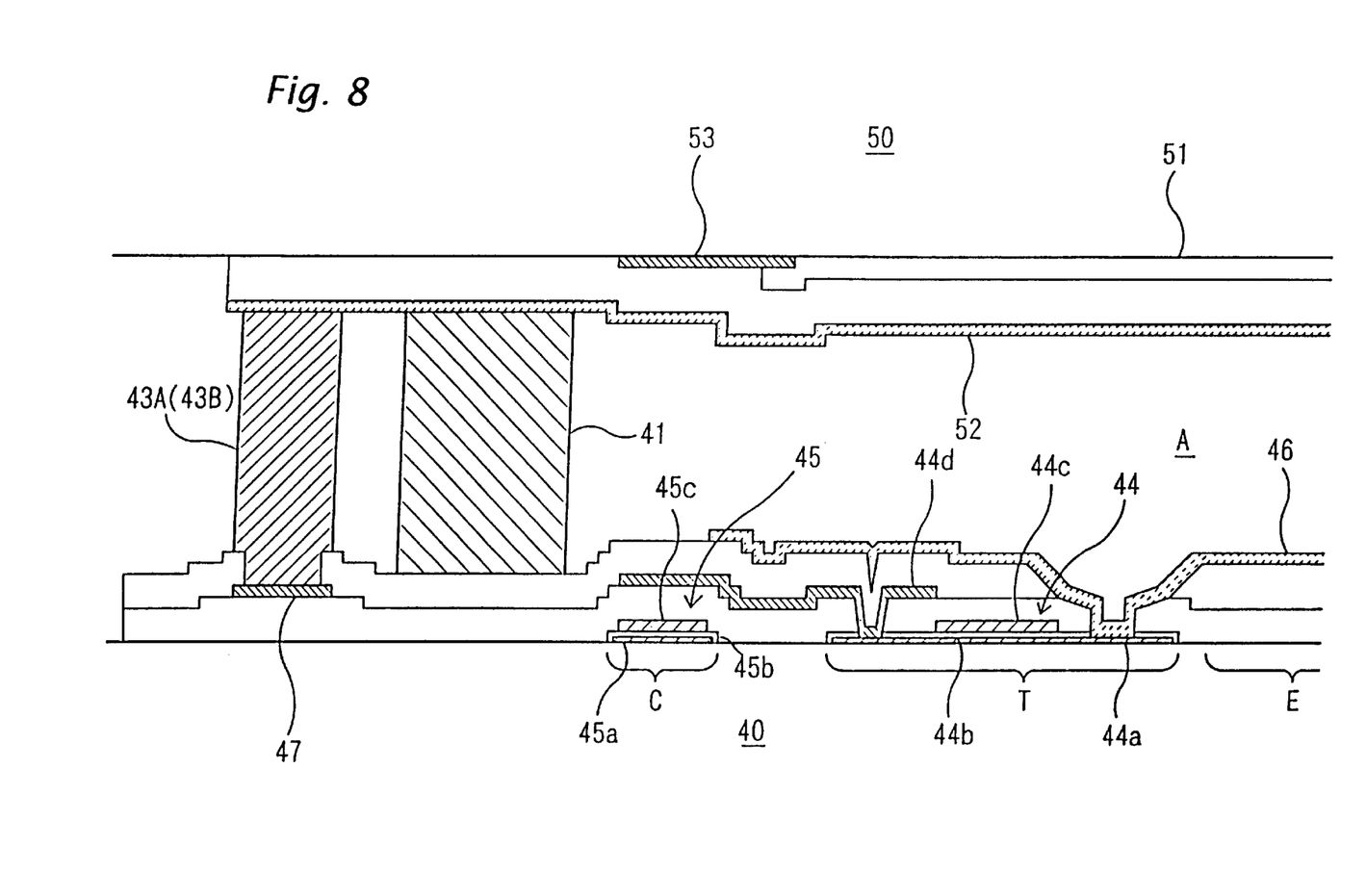
FIG. 8 is a schematic enlarged vertical sectional view showing the structure of the peripheral edge of the liquid crystal cell in the second embodiment.

FIG. 8 is a schematic sectional view showing the portion of the structure extending from the peripheral edge of the liquid crystal display area A to where the seal material 11 and the vertical electrically conducting members 43A or the insulating members 43B are formed. In the liquid crystal display area A, there are formed a TFT element 44, a storage capacitor 45, and a transparent electrode 46, being a pixel electrode, in pixels of a pixel structure similar to the pixel structure formed across the entire display area on the surface of the element substrate 40.

The structure, including the TFT element 44, the storage capacitor 45, and the pixel display portion, is essentially the same as the structure of FIG. 2, with the active layer 44a, the insulating layer 44b, the gate electrode 44c, and source electrode 44d, the lower electrode 45a, the insulating layer 45b, and the upper electrode 45c being essentially the same as their corresponding parts described above.

On the other hand, the opposing substrate 50 has formed on its surface a color filter 51 and a transparent electrode 52 formed on the color filter 51 through a protective film.

An insulating film, formed in the liquid crystal display area A, extends to the peripheral edge of the liquid crystal area A on the element substrate 40, and a wiring pattern, formed within the liquid crystal display area A and connected to a wiring layer (not shown), is led out. A light-obstructing layer 53, formed into the shape of a frame and at the outer side of the color filter 51, is formed on the opposing substrate 50. The light-obstructing layer 53 is made of the same material as a black matrix layer that is also formed in the color filter 51.

The seal material 41, which is formed at the outer side of the liquid crystal display area A, is used as a support between the element substrate 40 and the opposing substrate 50. Similarly, the vertical electrically conducting members 43A and the insulating members 43B are formed exteriorly of the seal material 41 as supporting columns between the element substrate 40 and the opposing substrate 50. The vertical electrically conducting members 43A, which are formed on the element substrate 40, contact a connecting pad 47 and the transparent electrode 52 in an electrically conductive manner, with the connecting pad 47 being connected to the signal input pads 48 in an electrically conductive manner. Connecting pads 47 are not formed at locations at the surface of the element substrate 40 where the insulating members 43B are formed.

In the present embodiment, the vertical electrically conducting members 43A and the insulating members 43B, being supporting columns, are disposed exteriorly of the four bent portions of the seal material 41, so that the pressing force of the opposing substrate 50 is sustained by the vertical electrically-conductive members 43A and the insulating members 43B, no matter what angle the opposing substrate 50 is tilted with respect to the element substrate when the substrates are being adhered together, thereby reducing the extent to which the seal material is deformed. As a result, the seal material performance of the seal material is preserved, thereby preventing leaks from the liquid crystal filling area. For example, when the supporting columns are not disposed exteriorly of the bent portions of the seal material, the seal material, depending on the tilting direction of the opposing substrate 50, is greatly deformed, which may seriously damage the liquid crystal cell at the corners.

The vertical electrically conducting members 43 in the present invention are ordinarily formed at appropriate locations in accordance with the electrical conducting member patterns on the inside surfaces of the element substrate 40 and the opposing substrate 50. In the present embodiment, when the insulating members 43B are formed, the vertical electrical conducting members 43A and the insulating members 43B are both disposed in such a way as to be virtually uniformly disposed along the outer periphery of the seal material 41. In other words, the insulating member forming locations are adjusted to uniformly dispose the supporting columns, thereby eliminating the need for adjusting the locations of the vertical electrically conducting members 43A, and thus the need for correcting the electrically conducting member patterns of both of the substrates in order to position the supporting columns.

Although in the present embodiment two vertical electrically conducting members 43A and two insulating members 43B were used, a different number of vertical electrically conducting members and insulating members and a different total number of them can be used in other embodiments, in accordance with the conductive patterns of the two substrates and other structures.

Third Embodiment

A description will now be given of a third embodiment, with reference to FIG. 10, in which a liquid crystal projector is used as an example of an electronic device in accordance with the present invention. The liquid crystal projector utilizes the liquid crystal display member constructed by the liquid crystal device producing methods in the above-described first or second embodiments.

Figure 10:
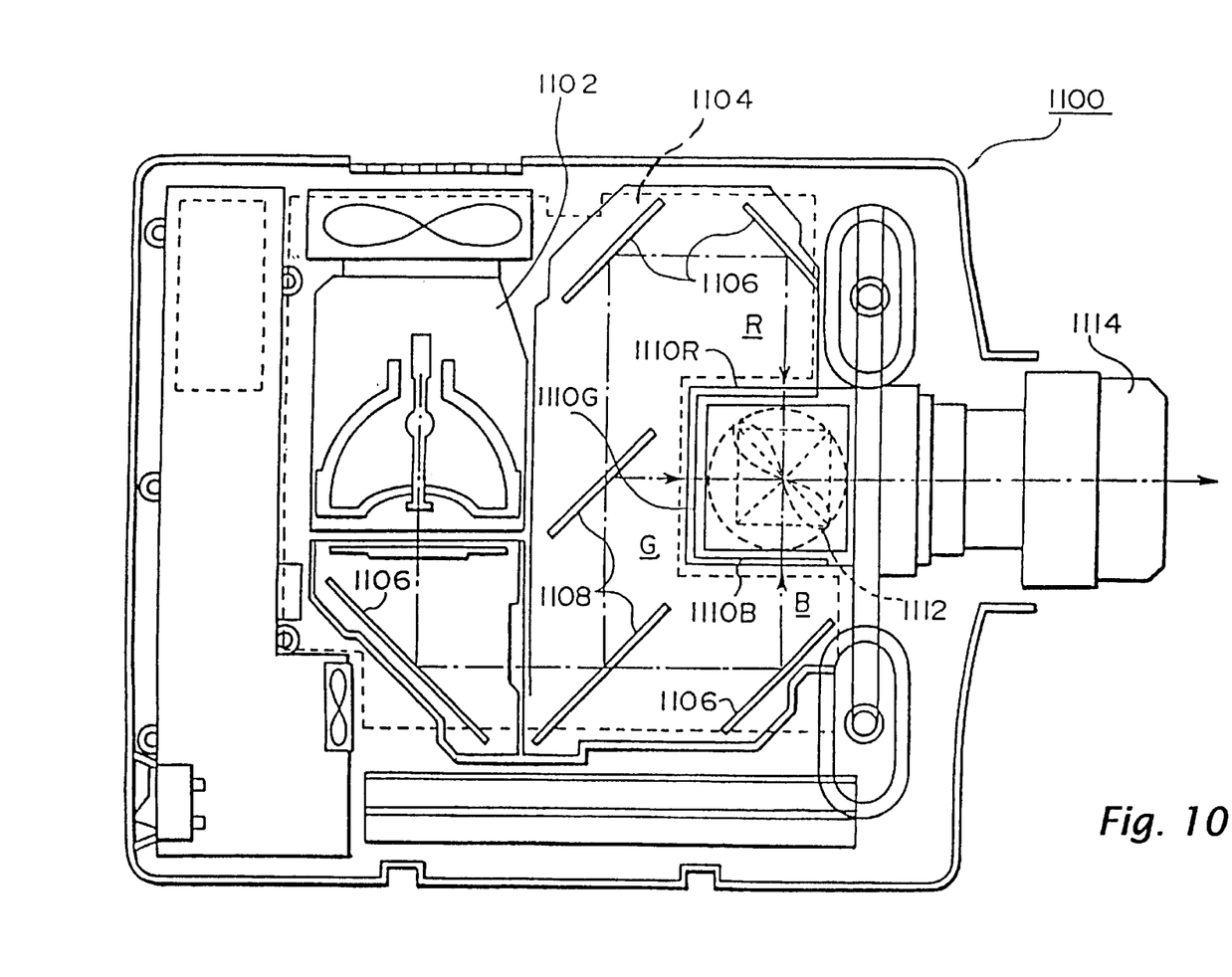
FIG. 10 is a schematic view showing the entire structure of a third embodiment in accordance with the present invention, showing the construction of a projection display apparatus.

Referring to FIG. 10, the liquid crystal projector 1100 is one utilizing a transmissive liquid crystal display member as a light valve, with an optical system including three prisms being used. The projection light, emitted from a lamp unit 1102 serving as a white light source, is separated into the three primary colors, red R, green G, and blue B, by a plurality of mirrors 1106 and dichroic mirrors 1108. The colors of the separated light irradiate the three liquid crystal display members 1110R, 1110G, and 1110B, that are arranged to form a C shape.

These liquid crystal display members 1110R, 1110G, and 1110B each have their display states controlled in correspondence with their color display components, based upon a pre-supplied image signal. Each of the colors, which have passed through their respective liquid crystal display members and have been modulated thereby, impinge upon a dichroic prism 1112 from three directions. At the dichroic prism 1112, the green G light continues to travel forward in a straight line, and the red R light and the blue B light change their directions of travel by 90 degrees, whereby the individual color images, produced as a result of the color light rays passing through each of the light crystal display members, are combined to form an image. The light carrying information of this image passes through a projecting lens 1114 and is projected onto, for example, a screen (not shown), as a result of which a color image is displayed on the screen.

The types of liquid crystal display members to be used in the third embodiment are preferably those liquid crystal display members described in the first embodiment and the second embodiment that have spacers only at the sealing portions between the substrates. This is because liquid crystal display members used in a liquid crystal projector must have a very fine pixel structure, little image distortion, and high light transmissivity. The liquid crystal display member of the present invention can be used extremely effectively as a high-quality liquid crystal display member that meets the aforementioned requirements.

The present invention is not limited to the above-described embodiments, so that various modifications can be made within the scope of the present invention.

INDUSTRIAL APPLICABILITY

As can be understood from the foregoing description, the present invention provides the following advantages.

According to the present invention, a plurality of supporting columns are disposed in a plane substantially uniformly along the outer periphery of the seal material placed on one of the substrates of the liquid crystal device, so that even when the other substrate, which is tilted, comes into contact with the substrate having the seal material placed thereon, during bonding of the substrates to construct a liquid crystal panel, the amount of deformation of the seal material is reduced by the supporting columns. Therefore, it is possible to prevent deformation of the seal material when the substrate comes into contact thereto from one side, and allow the seal material to firmly adhere onto the substrate in order to prevent leaks. Further, it is possible to obtain a uniform cell thickness distribution, even when the substrate comes into contact with the seal material from one side.

At least one of the supporting columns serves as an electrically conducting member between the substrates, so that the number of supporting columns used only as supporting columns can be reduced, making it possible to reduce the size of the display member, without reducing the size of the display area of the liquid crystal device.

In addition, when the liquid crystal device has a planar and substantially rectangular liquid crystal display area, the supporting columns are disposed near the corners of the seal material surrounding the area. Therefore, regardless of the tilting direction of the opposing substrate, a fewer number of supporting columns can be used to reliably sustain the stress from the substrate, thereby reducing the amount of deformation of the seal material, so that the seal material adheres more firmly onto the substrate.

Further, providing supporting columns at the cut portions located exteriorly of the bent portions of the seal material makes it unnecessary to provide new supporting column forming areas, thereby allowing size reduction of the display member. In addition, since the supporting columns are disposed exteriorly of the bent portions of the seal material, the supporting columns reliably sustain stress coming from the substrate, regardless of the tilting direction of the substrate, so that the effects of the device are enhanced.

Still further, the substrates are bonded together after placing unhardened supporting columns between the substrates and semi-hardening them, thereby further reducing the amount of deformation of the seal material, so that the effects of the device are further enhanced.

What is claimed is:

1. A liquid crystal device, comprising:
   a first substrate and a second substrate;
   a seal material which is interposed between said substrates in a generally rectangular shape including four corners, an outer portion of each of said corners being free of said seal material;
   a liquid crystal layer filled in a liquid crystal filling area enclosed by said substrates and said seal material;
   at least one supporting column interposed between said substrates at said portion of a first of said four corners to control a gap between the substrates;

at least one conductive member being formed between said substrates at said portion of a second of said four corners and connected in an electrically conductive manner between an electrode of said first substrate and an electrode of said second substrate; and terminals disposed along a side of the second substrate and connected to the electrode of said second substrate, wherein the conductive member is disposed closer to the terminals than the supporting column.

2. The liquid crystal device of claim 1, wherein the supporting columns are made of a conductive material.

3. A liquid crystal device, comprising a first substrate and a second substrate;

a seal material which is interposed between said substrates and is affixed such that a gap is formed between said substrates, said seal material including a first spacer;

a liquid crystal layer filled in a liquid crystal filling area enclosed by said substrates and said seal material;

at least one supporting column interposed between said substrates so as to be disposed along an outer periphery of said seal material; and at least one conductive member being formed between said substrates in order to be connected in an electrically conductive manner between an electrode of said first substrate and an electrode of said second substrate, said conductive member including a second spacer, wherein the diameter of the second spacer of the conductive member is larger than that of the first spacer of the seal material.

4. The liquid crystal device of claim 3, wherein one of the first and second spacer is made of first material, and the other spacer is made of the first material and a second material, the surface of the first material being surrounded by the second material.

5. The liquid crystal device of claim 4, wherein the first material is glass fiber.

6. The liquid crystal device of claim 4, wherein the second material includes Ni.

7. A liquid crystal device, comprising:

a first substrate and a second substrate, a seal material which is interposed between said substrates and is affixed such that a gap is formed between said substrates, said seal material including a first spacer;

a liquid crystal layer filled in a liquid crystal filling area enclosed by said substrates and said seal material;

at least one supporting column interposed between said substrates so as to be disposed along an outer periphery of said seal material; and at least one conductive member being formed between said substrates in order to be connected in an electrically conductive manner between an electrode of said first substrate and an electrode of said second substrate, said conductive member including a second spacer, wherein the diameter of the second spacer of the conductive member is larger than that of the first spacer of the seal material to control a gap between the substrates and the width of the conductive member is greater than that of said seal material.

8. The liquid crystal device of claim 7, wherein one of the first and second spacer is made of first material, and the other spacer is made of the first material and a second material, the surface of the first material being surrounded by the second material.

9. The liquid device of claim 7, wherein the first material is glass fiber.

10. The liquid crystal device of claim 7, wherein the second material includes Ni.

* * * * *

UNITED STATES PATENT AND TRADEMARK OFFICE
CERTIFICATE OF CORRECTION

PATENT NO. : 6,151,092  
DATED : November 21, 2000  
INVENTOR(S) : Fujimura et al.

Page 1 of 1

It is certified that error appears in the above-identified patent and that said Letters Patent is hereby corrected as shown below:

Title page,
Item [54], page 1, line 2, "SUPPORT" should be -- SUPPORTING --
Item [63], Related Data, "Continuation of application No. 09/091,599, filed as application No. PCT/JP97/03251, Jun. 16, 1998, Pat. No. 5,973,763" should be -- Continuation of application No. 09/091,599 filed 6/16/1998 now US Patent 5,973,763 which is a Continuation of PCT/JP97/03251 filed 10/16/97 --

Column 1, page 1,
Line 2, "SUPPORT" should be -- SUPPORTING --

Column 16, claim 9,
Line 31, after "liquid" insert -- crystal --

Signed and Sealed this

Fourth Day of September, 2001

*Attest:*

Nicholas P. Godici

*Attesting Officer*

NICHOLAS P. GODICI
*Acting Director of the United States Patent and Trademark Office*